US010717348B2

(12) United States Patent
Schellekens et al.

(10) Patent No.: US 10,717,348 B2
(45) Date of Patent: Jul. 21, 2020

(54) SURFACES OF PLASTIC GLAZING OF TAILGATES

(71) Applicant: SABIC GLOBAL TECHNOLOGIES B.V., Bergen op Zoom (NL)

(72) Inventors: Geert Jan Schellekens, Glize (NL); Matteo Terragni, Misinto (IT)

(73) Assignee: SABIC Global Technologies B.V., Bergen op Zoom (NL)

(*) Notice: Subject to any disclaimer, the term of this patent is extended or adjusted under 35 U.S.C. 154(b) by 0 days.

(21) Appl. No.: 16/534,446

(22) Filed: Aug. 7, 2019

(65) Prior Publication Data
US 2019/0359036 A1 Nov. 28, 2019

Related U.S. Application Data

(63) Continuation of application No. 15/756,649, filed as application No. PCT/IB2016/055333 on Sep. 7, 2016, now Pat. No. 10,434,846.
(Continued)

(51) Int. Cl.
*B60J 3/00* (2006.01)
*B60J 1/00* (2006.01)
(Continued)

(52) U.S. Cl.
CPC ......... *B60J 3/007* (2013.01); *B29C 45/14688* (2013.01); *B32B 27/00* (2013.01);
(Continued)

(58) Field of Classification Search
CPC ... B32B 27/365; B32B 27/00; B32B 2307/41; B32B 2307/414; B32B 2605/006; B60J 1/006; Y10T 428/24802
(Continued)

(56) References Cited

U.S. PATENT DOCUMENTS

| 4,551,484 A | 11/1985 | Radisch et al. |
| 4,558,634 A | 12/1985 | Oshiro et al. |

(Continued)

FOREIGN PATENT DOCUMENTS

| CA | 2762401 A | 6/2012 |
| CN | 101130292 A | 2/2008 |

(Continued)

OTHER PUBLICATIONS

International Patent Application No. PCT/EP2011/068667; Int'l Search Report; dated Jun. 1, 2012; 5 pages.
(Continued)

*Primary Examiner* — Betelhem Shewareged
(74) *Attorney, Agent, or Firm* — BakerHostetler

(57) ABSTRACT

A plastic glazing of a tailgate of a vehicle is provided, the plastic glazing comprising: a translucent component, wherein a portion of the translucent component forms a rear window of the vehicle; a non-transparent component molded onto the translucent component, wherein an overlapping portion of the translucent component and the non-transparent component forms a blackout region proximate to the rear window, wherein the plastic glazing is of one-piece molded plastic construction, wherein the translucent component comprises a first textured surface in a region adjacent to the blackout region, where the first textured surface is configured to conceal a component of the vehicle.

14 Claims, 11 Drawing Sheets

Related U.S. Application Data

(60) Provisional application No. 62/215,085, filed on Sep. 7, 2015.

(51) Int. Cl.

| | | |
|---|---|---|
| *B32B 27/08* | (2006.01) | |
| *B32B 27/36* | (2006.01) | |
| *B60J 1/18* | (2006.01) | |
| *B60Q 1/00* | (2006.01) | |
| *B60Q 1/26* | (2006.01) | |
| *F21S 43/20* | (2018.01) | |
| *B32B 27/00* | (2006.01) | |
| *B29C 45/14* | (2006.01) | |
| B29C 45/16 | (2006.01) | |
| B29K 69/00 | (2006.01) | |
| B29L 31/30 | (2006.01) | |

(52) U.S. Cl.
CPC ............ *B32B 27/08* (2013.01); *B32B 27/365* (2013.01); *B60J 1/006* (2013.01); *B60J 1/18* (2013.01); *B60Q 1/0035* (2013.01); *B60Q 1/26* (2013.01); *F21S 43/26* (2018.01); *B29C 45/16* (2013.01); *B29K 2069/00* (2013.01); *B29L 2031/30* (2013.01); *B32B 2307/41* (2013.01); *B32B 2307/412* (2013.01); *B32B 2307/414* (2013.01); *B32B 2605/006* (2013.01); *Y10T 428/24802* (2015.01)

(58) Field of Classification Search
USPC ......................................................... 428/221
See application file for complete search history.

(56) References Cited

U.S. PATENT DOCUMENTS

| | | |
|---|---|---|
| 4,609,688 A | 9/1986 | Radisch et al. |
| 4,636,698 A | 1/1987 | Leclercq |
| 4,645,970 A | 2/1987 | Murphy |
| 4,712,287 A | 12/1987 | Johnston |
| 4,765,672 A | 8/1988 | Weaver |
| 4,775,402 A | 10/1988 | Letemps et al. |
| 4,778,366 A | 10/1988 | Weaver |
| 4,792,425 A | 12/1988 | Weaver |
| 4,871,385 A | 10/1989 | Lecourt et al. |
| 4,888,072 A | 12/1989 | Ohlenforst et al. |
| 5,060,440 A | 10/1991 | Weaver |
| 5,071,709 A | 12/1991 | Berquier et al. |
| 5,324,374 A | 6/1994 | Harmand et al. |
| 5,443,862 A | 8/1995 | Buffat et al. |
| 5,451,090 A | 9/1995 | Brodie et al. |
| 5,495,400 A | 2/1996 | Currie |
| 5,505,023 A | 4/1996 | Gillen et al. |
| 5,508,585 A | 4/1996 | Butt |
| 5,637,363 A | 6/1997 | Leray et al. |
| 5,669,693 A | 9/1997 | Smith |
| 5,726,953 A | 3/1998 | Lapointe et al. |
| 5,757,127 A | 5/1998 | Inoguchi et al. |
| 5,772,304 A | 6/1998 | Smith |
| 5,776,603 A | 7/1998 | Zagdoun et al. |
| 5,780,965 A | 7/1998 | Cass et al. |
| 5,807,515 A | 9/1998 | Fisher et al. |
| 5,857,770 A | 1/1999 | Fohl et al. |
| 5,887,393 A | 3/1999 | Vanark et al. |
| 5,890,796 A | 4/1999 | Marinelli et al. |
| 5,965,981 A | 10/1999 | Inoguchi et al. |
| 6,054,189 A | 4/2000 | Bravet et al. |
| 6,106,931 A | 8/2000 | Ito et al. |
| 6,224,135 B1 | 5/2001 | Rehkopf |
| 6,241,302 B1 | 6/2001 | Rehkopf |
| 6,432,332 B1 | 8/2002 | Matsco et al. |
| 6,461,028 B1 | 10/2002 | Huang |
| 6,468,677 B1 | 10/2002 | Benton et al. |
| 6,536,930 B1 | 3/2003 | Hirmer |
| 6,585,402 B2 | 7/2003 | Ohkodo et al. |
| 6,627,319 B2 | 9/2003 | Jacquiod et al. |
| 6,660,968 B1 | 12/2003 | Mottelet et al. |
| 6,747,779 B1 | 6/2004 | Morin et al. |
| 6,811,857 B1 | 11/2004 | Bravet et al. |
| 6,811,895 B2 | 11/2004 | Murasko et al. |
| 6,852,393 B2 | 2/2005 | Gandon |
| 6,872,453 B2 | 3/2005 | Arnaud et al. |
| 6,908,204 B2 | 6/2005 | Kraft |
| 6,965,196 B2 | 11/2005 | Murasko et al. |
| 7,012,728 B2 | 3/2006 | Morin et al. |
| 7,018,057 B2 | 3/2006 | Richard |
| 7,024,822 B2 | 4/2006 | Scheer et al. |
| 7,025,482 B2 | 4/2006 | Yamashita et al. |
| 7,026,577 B2 | 4/2006 | Maeuser et al. |
| 7,048,400 B2 | 5/2006 | Murasko et al. |
| 7,048,422 B1 | 5/2006 | Solomon |
| 7,048,423 B2 | 5/2006 | Stepanenko et al. |
| 7,100,328 B2 | 9/2006 | Scheer et al. |
| 7,144,289 B2 | 12/2006 | Murasko et al. |
| 7,172,322 B2 | 2/2007 | Pommeret et al. |
| 7,265,889 B2 | 9/2007 | Morin et al. |
| 7,270,863 B2 | 9/2007 | Harima et al. |
| 7,290,906 B2 | 11/2007 | Suzuki et al. |
| 7,311,976 B2 | 12/2007 | Arnaud et al. |
| 7,318,663 B2 | 1/2008 | Verbrugh et al. |
| 7,469,450 B2 | 12/2008 | Gipson |
| 7,500,774 B2 | 3/2009 | Nishiyama et al. |
| 7,553,536 B1 | 6/2009 | Naoumenko et al. |
| 7,584,689 B2 | 9/2009 | Jones et al. |
| 7,654,721 B2 | 2/2010 | Okada |
| 7,686,489 B2 | 3/2010 | Ajiki et al. |
| 7,712,933 B2 | 5/2010 | Fleischmann et al. |
| 7,745,018 B2 | 6/2010 | Murasko et al. |
| 7,793,580 B2 | 9/2010 | Jones et al. |
| 7,806,538 B2 | 10/2010 | Ajiki et al. |
| 7,815,345 B2 | 10/2010 | Misawa et al. |
| 7,857,495 B2 | 12/2010 | Misawa et al. |
| 7,883,249 B2 | 2/2011 | Totani et al. |
| 7,892,661 B2 | 2/2011 | Boire et al. |
| 7,922,374 B2 | 4/2011 | Schwab et al. |
| 7,929,194 B2 | 4/2011 | Legois et al. |
| 7,985,011 B2 | 7/2011 | Ajiki et al. |
| 8,007,152 B2 | 8/2011 | Nakabayashi |
| 8,025,004 B2 | 9/2011 | Jones et al. |
| 8,044,415 B2 | 10/2011 | Messere et al. |
| 8,057,615 B2 | 11/2011 | Grussaute-Nghiem et al. |
| 8,083,388 B2 | 12/2011 | Sun et al. |
| 8,179,034 B2 | 5/2012 | Potts et al. |
| 8,226,282 B2 | 7/2012 | Kazaoka et al. |
| 8,297,168 B2 | 10/2012 | Jones et al. |
| 8,298,032 B2 | 10/2012 | Potts et al. |
| 8,303,147 B2 | 11/2012 | Jeon |
| 8,314,546 B2 | 11/2012 | Tchakarov |
| 8,317,381 B2 | 11/2012 | Heidinger |
| 8,339,040 B2 | 12/2012 | Bruton et al. |
| 8,349,445 B2 | 1/2013 | Jacquiod et al. |
| 8,384,520 B2 | 2/2013 | Fourreau |
| 8,403,399 B2 | 3/2013 | Kuntze et al. |
| 8,408,773 B2 | 4/2013 | Judge |
| 8,471,177 B2 | 6/2013 | Chaussade et al. |
| 8,550,536 B2 | 10/2013 | Gachter et al. |
| 8,585,263 B2 | 11/2013 | Shipman |
| 8,622,458 B2 | 1/2014 | Hache |
| 8,641,257 B2 | 2/2014 | Richardson |
| 8,646,829 B2 | 2/2014 | Crane et al. |
| 8,690,220 B2 | 4/2014 | Tsukiyama et al. |
| 8,697,186 B2 | 4/2014 | Zagdoun et al. |
| 8,727,422 B2 | 5/2014 | Iwabuchi et al. |
| 8,808,790 B2 | 8/2014 | Zagdoun et al. |
| 8,829,539 B2 | 9/2014 | Kleo et al. |
| 9,006,751 B2 | 4/2015 | Kleo et al. |
| 9,090,120 B2 | 7/2015 | Pires et al. |
| 9,210,771 B2 | 12/2015 | Day |
| 9,637,184 B1 | 5/2017 | Bennett et al. |
| 9,821,862 B2 | 11/2017 | Han et al. |
| 9,902,437 B2 | 2/2018 | Demange et al. |
| 2002/0037421 A1 | 3/2002 | Arnaud et al. |
| 2004/0005472 A1 | 1/2004 | Arnaud et al. |

(56) References Cited

U.S. PATENT DOCUMENTS

| | | |
|---|---|---|
| 2004/0191618 A1 | 9/2004 | Morin et al. |
| 2004/0218400 A1 | 11/2004 | Egashira |
| 2004/0265512 A1 | 12/2004 | Aengenheyster et al. |
| 2005/0045613 A1 | 3/2005 | Maeuser et al. |
| 2005/0147825 A1 | 7/2005 | Arnaud et al. |
| 2005/0168013 A1 | 8/2005 | Rinklin |
| 2005/0242721 A1 | 11/2005 | Foust et al. |
| 2006/0005484 A1 | 1/2006 | Riblier et al. |
| 2006/0033978 A1 | 2/2006 | Morin et al. |
| 2006/0210772 A1* | 9/2006 | Bui .................. B32B 3/263 |
| | | 428/157 |
| 2006/0210778 A1 | 9/2006 | Benyahia et al. |
| 2007/0026235 A1* | 2/2007 | Chen .................. C08J 7/04 |
| | | 428/411.1 |
| 2007/0068375 A1 | 3/2007 | Jones et al. |
| 2007/0068376 A1 | 3/2007 | Jones et al. |
| 2007/0157671 A1 | 7/2007 | Thellier et al. |
| 2008/0241523 A1 | 10/2008 | Huignard et al. |
| 2008/0254299 A1 | 10/2008 | Blackburn et al. |
| 2008/0264930 A1 | 10/2008 | Mennechez et al. |
| 2009/0110918 A1 | 4/2009 | Jacquiod et al. |
| 2009/0308239 A1 | 12/2009 | Jones et al. |
| 2010/0026045 A1 | 2/2010 | Thomas |
| 2010/0061093 A1 | 3/2010 | Janssen et al. |
| 2010/0288117 A1 | 11/2010 | Jones et al. |
| 2011/0033667 A1 | 2/2011 | Leconte et al. |
| 2011/0061302 A1 | 3/2011 | Barral et al. |
| 2011/0240343 A1 | 10/2011 | Zagdoun et al. |
| 2011/0241376 A1* | 10/2011 | Igura .................. B60J 5/101 |
| | | 296/146.3 |
| 2011/0248219 A1 | 10/2011 | Zagdoun et al. |
| 2011/0250387 A1 | 10/2011 | Zagdoun et al. |
| 2012/0001027 A1 | 1/2012 | Jones et al. |
| 2012/0153670 A1 | 6/2012 | Crane et al. |
| 2012/0229907 A1 | 9/2012 | Ueda |
| 2012/0248814 A1 | 10/2012 | Tsukiyama et al. |
| 2012/0280533 A1 | 11/2012 | Gachter et al. |
| 2012/0320621 A1 | 12/2012 | Kleo et al. |
| 2013/0033894 A1 | 2/2013 | Kleo et al. |
| 2013/0051049 A1 | 2/2013 | Sato |
| 2013/0135885 A1 | 5/2013 | Anzai |
| 2013/0182451 A1 | 7/2013 | Oba et al. |
| 2013/0201709 A1 | 8/2013 | Natsume |
| 2013/0280452 A1 | 10/2013 | Nawroth et al. |
| 2013/0293105 A1 | 11/2013 | Day |
| 2013/0313601 A1 | 11/2013 | Aeling et al. |
| 2013/0314935 A1 | 11/2013 | Tokieda et al. |
| 2014/0003076 A1 | 1/2014 | Suganumata et al. |
| 2014/0077525 A1 | 3/2014 | Yoshimura et al. |
| 2014/0110964 A1 | 4/2014 | Schijve et al. |
| 2014/0327269 A1 | 11/2014 | Agius et al. |
| 2015/0084370 A1 | 3/2015 | Newberry et al. |
| 2015/0153014 A1 | 6/2015 | Salter et al. |
| 2015/0274223 A1 | 10/2015 | Wolf et al. |
| 2017/0301981 A1 | 10/2017 | Niihara et al. |
| 2018/0050741 A1 | 2/2018 | Wolf et al. |
| 2018/0112847 A1 | 4/2018 | Childress et al. |
| 2018/0186220 A1 | 7/2018 | Leterrier et al. |
| 2018/0236699 A1 | 8/2018 | Schellekens et al. |
| 2018/0244136 A1* | 8/2018 | Schellekens .......... B60Q 1/0035 |
| 2018/0251166 A1 | 9/2018 | Escoffier et al. |
| 2018/0252382 A1 | 9/2018 | Schellekens et al. |

FOREIGN PATENT DOCUMENTS

| | | |
|---|---|---|
| CN | 201566450 U | 9/2010 |
| CN | 102458890 B | 5/2014 |
| CN | 103772921 A | 5/2014 |
| CN | 203655050 U | 6/2014 |
| CN | 203713981 U | 7/2014 |
| CN | 203844852 U | 9/2014 |
| DE | 19706043 A1 | 6/1998 |
| DE | 69617705 T2 | 8/2002 |
| DE | 10147537 A1 | 4/2003 |
| DE | 69530806 T2 | 4/2004 |
| DE | 69929597 T2 | 9/2006 |
| DE | 60025815 T2 | 11/2006 |
| DE | 60027335 T2 | 1/2007 |
| DE | 60219518 T2 | 1/2008 |
| DE | 102008004942 | 6/2009 |
| DE | 102009058788 A1 | 6/2011 |
| DE | 202011110333 U1 | 8/2013 |
| EP | 0266514 A2 | 5/1988 |
| EP | 0267331 A1 | 5/1988 |
| EP | 0235447 B1 | 2/1994 |
| EP | 0453092 B1 | 8/1994 |
| EP | 0671864 A2 | 9/1995 |
| EP | 1000809 A1 | 5/2000 |
| EP | 1494062 A2 | 1/2005 |
| EP | 1787841 A2 | 5/2007 |
| EP | 1892182 A1 | 2/2008 |
| EP | 1950492 A1 | 7/2008 |
| EP | 1992478 A1 | 11/2008 |
| EP | 2005226 A1 | 12/2008 |
| EP | 1261557 B1 | 11/2009 |
| EP | 2219862 A1 | 8/2010 |
| EP | 2275770 A1 | 1/2011 |
| EP | 2275771 A1 | 1/2011 |
| EP | 2275772 A1 | 1/2011 |
| EP | 2287557 A1 | 2/2011 |
| EP | 1824696 B1 | 1/2012 |
| EP | 2574142 A1 | 3/2013 |
| EP | 1897412 B1 | 12/2013 |
| FR | 2792628 A1 | 10/2000 |
| FR | 2863210 A1 | 6/2005 |
| FR | 2884148 B1 | 9/2007 |
| FR | 2961151 B1 | 6/2012 |
| FR | 2968631 A1 | 6/2012 |
| FR | 2996803 A1 | 4/2014 |
| GB | 1329505 A | 9/1973 |
| GB | 1480193 A | 7/1977 |
| GB | 2442364 A | 4/2008 |
| GB | 2513620 A | 11/2014 |
| JP | H08-050933 A | 2/1996 |
| JP | H08-207204 A | 8/1996 |
| JP | 2584764 B2 | 2/1997 |
| JP | H10-036706 A | 2/1998 |
| JP | H10-180183 A | 7/1998 |
| JP | 10-329165 A | 12/1998 |
| JP | 2000-233951 A | 8/2000 |
| JP | 2000-301985 A | 10/2000 |
| JP | 2002-518207 A | 6/2002 |
| JP | 2002-533233 A | 10/2002 |
| JP | 2002-543027 A | 12/2002 |
| JP | 2003-513840 A | 4/2003 |
| JP | 3445860 B2 | 9/2003 |
| JP | 2003-529462 A | 10/2003 |
| JP | 2004-534667 A | 11/2004 |
| JP | 2005-511473 A | 4/2005 |
| JP | 3741461 B2 | 2/2006 |
| JP | 3961583 B2 | 8/2007 |
| JP | 2008-528329 A | 7/2008 |
| JP | 2008-543706 A | 12/2008 |
| JP | 2008-545465 A | 12/2008 |
| JP | 2009-500271 A | 1/2009 |
| JP | 2009-512977 A | 3/2009 |
| JP | 4242743 B2 | 3/2009 |
| JP | 4251678 B2 | 4/2009 |
| JP | 4440641 B2 | 3/2010 |
| JP | 2010-188792 A | 9/2010 |
| JP | 2010-247676 A | 11/2010 |
| JP | 2010-260519 A | 11/2010 |
| JP | 2011-051544 A | 3/2011 |
| JP | 2011-057188 A | 3/2011 |
| JP | 2011-514849 A | 5/2011 |
| JP | 2011-121479 A | 6/2011 |
| JP | 2011-126388 A | 6/2011 |
| JP | 4700804 B2 | 6/2011 |
| JP | 2011-136606 A | 7/2011 |
| JP | 4754044 B2 | 8/2011 |
| JP | 4771262 B2 | 9/2011 |
| JP | 2011-219000 A | 11/2011 |
| JP | 2012-030654 A | 2/2012 |

(56) References Cited

FOREIGN PATENT DOCUMENTS

| | | |
|---|---|---|
| JP | 2012-503716 A | 2/2012 |
| JP | 2012-503852 A | 2/2012 |
| JP | 2012-046109 A | 3/2012 |
| JP | 2012-061957 A | 3/2012 |
| JP | 2012-131375 A | 7/2012 |
| JP | 5015764 B2 | 8/2012 |
| JP | 2012-206612 A | 10/2012 |
| JP | 2012-206614 A | 10/2012 |
| JP | 5054376 B2 | 10/2012 |
| JP | 5107242 B2 | 12/2012 |
| JP | 2013-006570 A | 1/2013 |
| JP | 5128733 B2 | 1/2013 |
| JP | 2013-056669 A | 3/2013 |
| JP | 5160900 B2 | 3/2013 |
| JP | 2013-517989 A | 5/2013 |
| JP | 2013-517990 A | 5/2013 |
| JP | 2013-124006 A | 6/2013 |
| JP | 5235658 B2 | 7/2013 |
| JP | 5243447 B2 | 7/2013 |
| JP | 2013-230716 A | 11/2013 |
| JP | 2013-230717 A | 11/2013 |
| JP | 2013-230723 A | 11/2013 |
| JP | 5479732 B2 | 4/2014 |
| JP | 2014-076707 A | 5/2014 |
| JP | 2014-091342 A | 5/2014 |
| JP | 2014-101055 A | 6/2014 |
| JP | 2014-104790 A | 6/2014 |
| JP | 2014-159243 A | 9/2014 |
| KR | 2008-0034314 A | 4/2008 |
| WO | WO 1987/003846 A1 | 7/1987 |
| WO | WO 1994/022779 A2 | 10/1994 |
| WO | WO 1998/047703 A1 | 10/1998 |
| WO | WO 1999/003678 A1 | 1/1999 |
| WO | WO 1999/065678 A1 | 12/1999 |
| WO | WO 2000/037374 A1 | 6/2000 |
| WO | WO 2000/057243 A1 | 9/2000 |
| WO | WO 2000/067530 A1 | 11/2000 |
| WO | WO 2001/026924 A1 | 4/2001 |
| WO | WO 2002/002472 A1 | 1/2002 |
| WO | WO 2002/072330 A1 | 9/2002 |
| WO | WO 2003/010105 A1 | 2/2003 |
| WO | WO 2003/026869 A1 | 4/2003 |
| WO | WO 2006/030165 A1 | 3/2006 |
| WO | WO 2006/091959 A2 | 8/2006 |
| WO | WO 2006/095005 A1 | 9/2006 |
| WO | WO 2006/135832 A2 | 12/2006 |
| WO | WO 2007/003849 A2 | 1/2007 |
| WO | WO 2007/003849 A3 | 1/2007 |
| WO | WO 2007/119019 A1 | 10/2007 |
| WO | WO 2008/104728 A2 | 9/2008 |
| WO | WO 2008/132397 A2 | 11/2008 |
| WO | WO 2009/074266 A1 | 6/2009 |
| WO | WO 2010/034944 A1 | 4/2010 |
| WO | WO 2010/034945 A1 | 4/2010 |
| WO | WO 2010/034949 A1 | 4/2010 |
| WO | WO 2010/034950 A1 | 4/2010 |
| WO | WO 2010/049638 A1 | 5/2010 |
| WO | WO 2009/056775 A2 | 8/2010 |
| WO | WO 2011/092419 A1 | 4/2011 |
| WO | WO 2011/092420 A2 | 4/2011 |
| WO | WO 2011/092421 A1 | 4/2011 |
| WO | WO 2011/054826 A1 | 5/2011 |
| WO | WO 2011/067541 A1 | 6/2011 |
| WO | WO 2011/157911 A1 | 12/2011 |
| WO | WO 2012/055873 A2 | 5/2012 |
| WO | WO 2012/055873 A3 | 5/2012 |
| WO | WO 2012/080621 A1 | 6/2012 |
| WO | WO 2012/085433 A1 | 6/2012 |
| WO | WO 2012/098330 A1 | 7/2012 |
| WO | WO 2012/104530 A1 | 8/2012 |
| WO | WO 2012/126708 A1 | 9/2012 |
| WO | WO 2012/168009 A1 | 12/2012 |
| WO | WO 2012/168628 A1 | 12/2012 |
| WO | WO 2012/168646 A1 | 12/2012 |
| WO | WO 2013/017790 A1 | 2/2013 |
| WO | WO 2013/017791 A1 | 2/2013 |
| WO | WO 2013/017792 A1 | 2/2013 |
| WO | WO 2013/054059 A1 | 4/2013 |
| WO | WO 2013/068678 A1 | 5/2013 |
| WO | WO 2013/068679 A1 | 5/2013 |
| WO | WO 2013/079832 A1 | 6/2013 |
| WO | WO 2013/087518 A1 | 6/2013 |
| WO | WO 2013/093301 A1 | 6/2013 |
| WO | WO 2013/110885 A1 | 8/2013 |
| WO | WO 2013/121134 A1 | 8/2013 |
| WO | WO 2013/153303 A1 | 10/2013 |
| WO | WO 2013/167832 A1 | 11/2013 |
| WO | WO 2014/009630 A1 | 1/2014 |
| WO | WO 2014/020249 A1 | 2/2014 |
| WO | WO 2014/037643 A1 | 3/2014 |
| WO | WO 2014/037671 A1 | 3/2014 |
| WO | WO 2014/057200 A1 | 4/2014 |
| WO | WO 2014/060338 A1 | 4/2014 |
| WO | WO 2015/052655 A1 | 4/2015 |
| WO | WO 2015/079186 A1 | 6/2015 |

OTHER PUBLICATIONS

International Patent Application No. PCT/EP2011/068667; Int'l Preliminary Report on Patentability; dated Apr. 30, 2013; 12 pages.
International Patent Application No. PCT/DE2005/002068; Int'l Preliminary Report on Patentability; dated May 22, 2007; 5 pages.
Bauer D.R.; "Application of Failure Models for Predicting Weatherability in Automotive Coatings"; American Chemical Society; Chapter 24; 1999; p. 378-395.
Anand et al.; "Role of adhesives in the dimensional stability of polycarbonate structural panels"; Int'l Journal of Adhesion & Adhesives; vol. 27; 2007; p. 338-350.
International Patent Application No. PCT/IB2016/055338; Int'l Search Report and the Written Opinion; dated Nov. 25, 2016; 15 pages.
International Patent Application No. PCT/IB2016/055338; Int'l Preliminary Report on Patentability; dated Mar. 22, 2018; 10 pages.
International Patent Application No. PCT/IB2016/055334; Int'l Written Opinion and the Search Report; dated Nov. 22, 2016; 10 pages.
International Patent Application No. PCT/IB2016/055334; Int'l Preliminary Report on Patentability; dated Mar. 22, 2018; 7 pages.
International Patent Application No. PCT/IB2016/055333; Int'l Written Opinion and the Search Report; dated Jan. 2, 2017; 11 pages.
International Patent Application No. PCT/IB2016/055333; Int'l Preliminary Report on Patentability; dated Mar. 22, 2018; 7 pages.
International Patent Application No. PCT/IB2016/055332; Int'l Search Report and the Written Opinion; dated Jan. 2, 2017; 12 pages.
International Patent Application No. PCT/IB2016/055332; Int'l Preliminary Report on Patentability; dated Mar. 22, 2018; 8 pages.

* cited by examiner

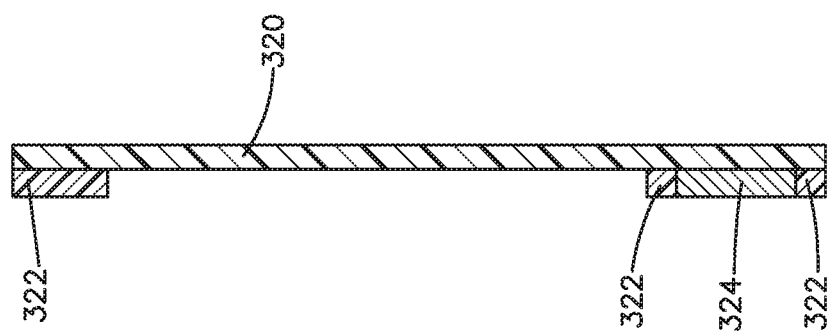

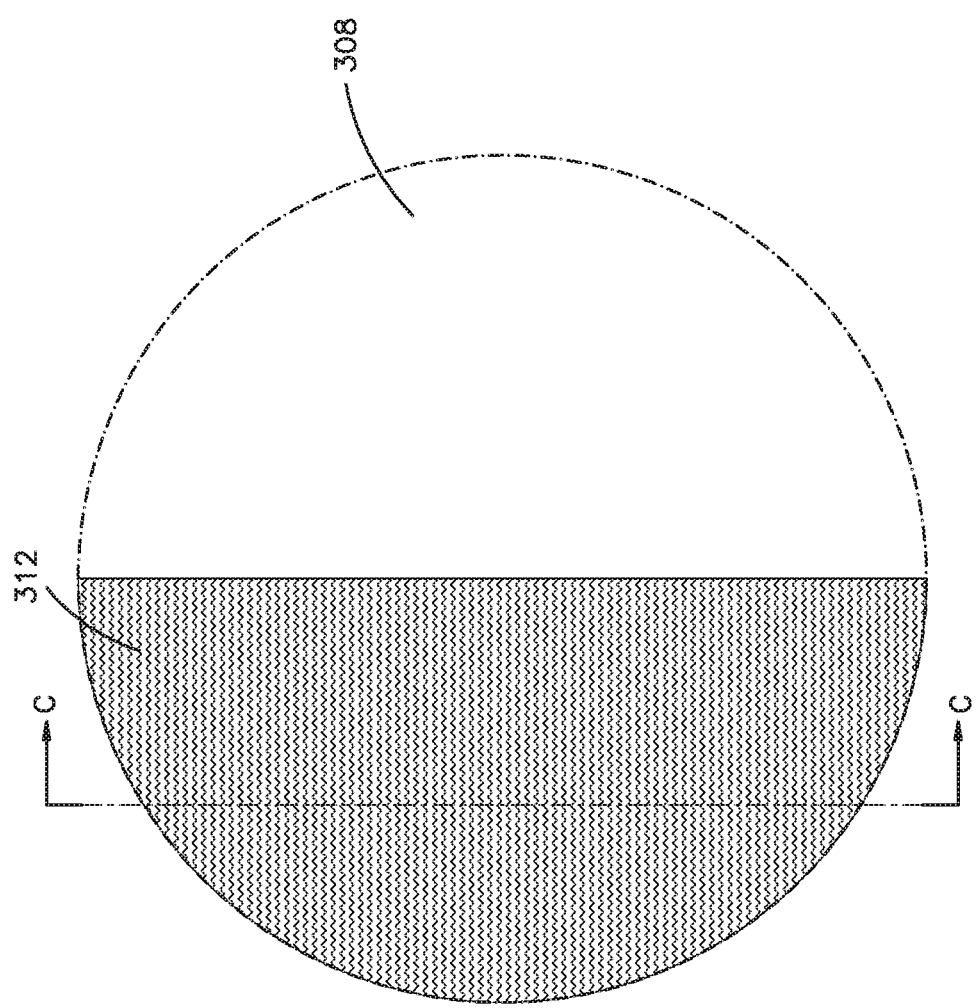

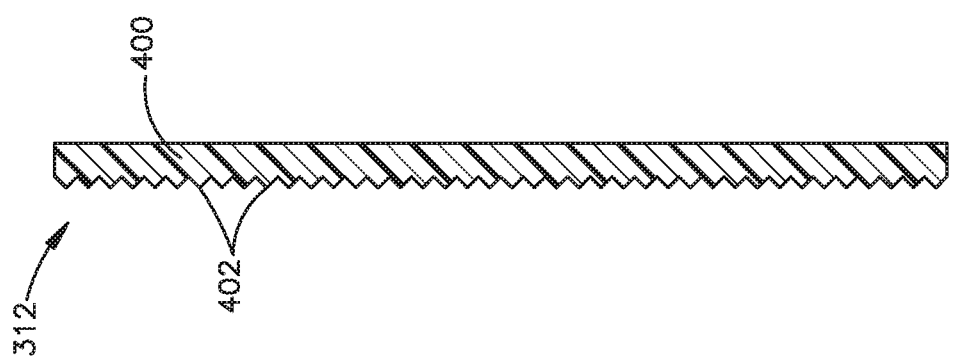

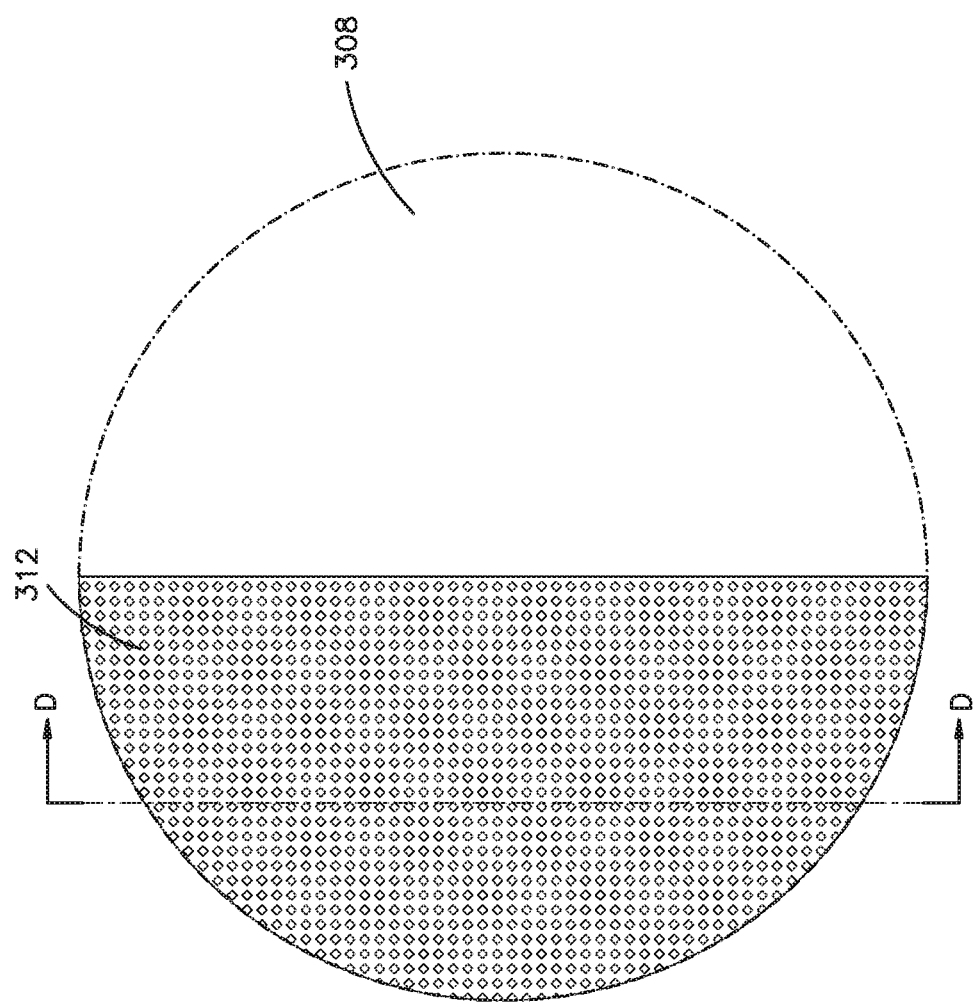

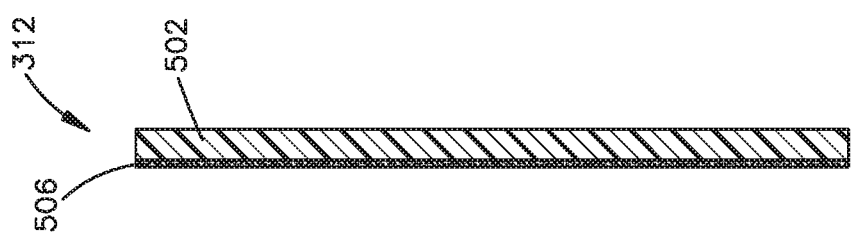

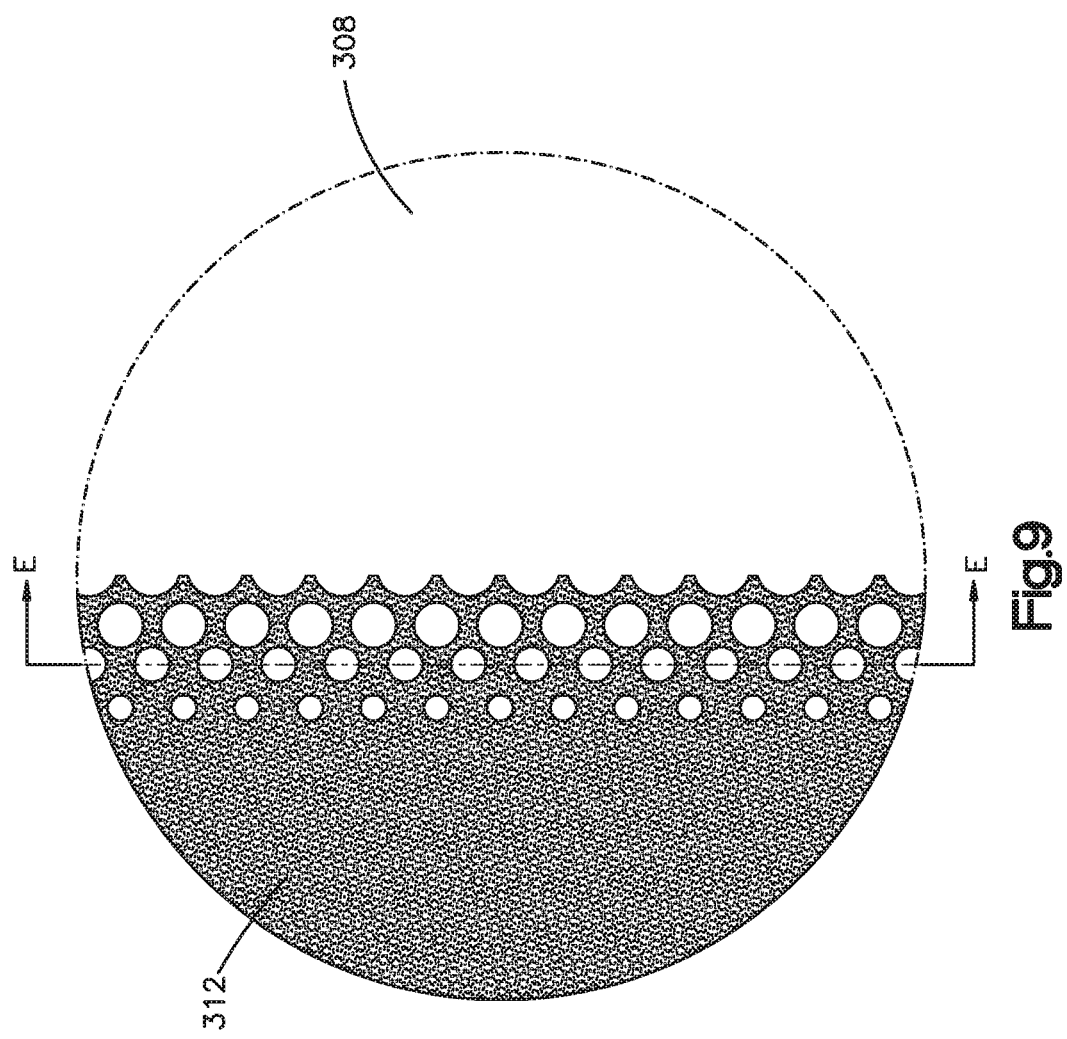

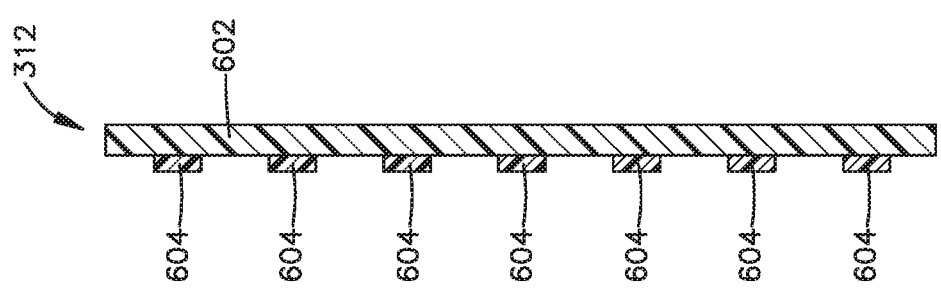

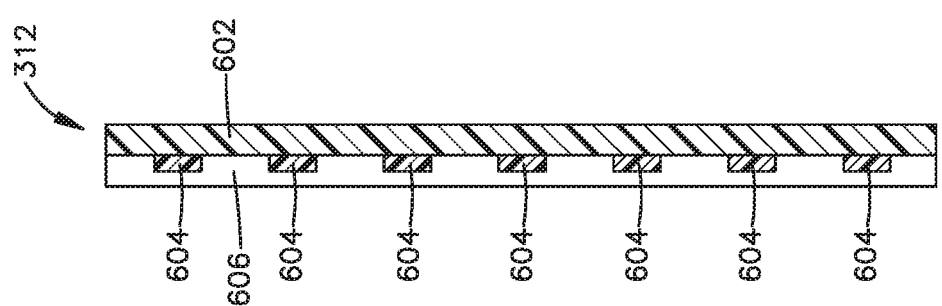

SURFACES OF PLASTIC GLAZING OF TAILGATES

RELATED APPLICATION

The present application is a continuation of U.S. application Ser. No. 15/756,649 filed Mar. 1, 2018, which is the National Stage of International Application No. PCT/IB32016/055333 filed Sep. 7, 2016, which claims priority to and the benefit of U.S. Provisional Application No. 62/215,085 filed Sep. 7, 2015, the disclosures of all of which are incorporated herein by this reference in their entireties.

BACKGROUND

Technical Field

The present disclosure relates to tailgates and, specifically, to surfaces of a plastic glazing of a tailgate including textures and/or patterns.

Technical Background

Vehicles such as sports utility vehicles ("SUVs"), vans, hatchbacks, and the like include a structural component known as a tailgate. The tailgate is provided to open or close an opening formed at a rear portion of a vehicle. The tailgate is typically hinged to the main vehicle body, for example, along its upper end, such that it can swing open and close. Examples of tailgates include a rear door tailgate or a truck lid tailgate.

The tailgate may support one or more other vehicle components, such as a rear glass window and one or more light assemblies (e.g., a supplemental brake light, a puddle light). The tailgate may also be adjacent to body cavities into which rear lamp units are inserted. These parts and other parts may add to the cost and complexity of assembling a vehicle.

Light assemblies in vehicles, in particular, comprise a large number of separate components. For example, a typical vehicle may have several different types of lights, including, for example, parking lights, turn indicator lights, brake lights, and the like. Each of these lights may be made from many parts. These parts add to the cost and complexity of assembling a vehicle. Accordingly, as recognized in U.S. Pat. No. 7,048,423 ("the '423 patent"), it desirable to have a lighting assembly with fewer parts. The '423 patent discloses an integrated light assembly including a plurality of lamps 210, 216 enclosed in a housing 202, which may serve as a lens for the lamps, and mounted on a substrate 204. Because the lamps 210, 216 share a common substrate and lens, the additional cost of having a separate lamp assembly is eliminated. This structure disclosed in the '423 patent, however, has many drawbacks. For one, because multiple lamps are mounted together in a single housing without sidewalls or reflectors for directing the angle of their light, the structure does not account for haziness issues. Moreover, if two lights of varying color are mounted in the housing, the structure disclosed in the '423 patent does not have a way of preventing color overlap. These drawbacks may limit the use of such a light assembly in a vehicle under state and federal regulations governing vehicle lighting requirements. Thus, while the '423 patent discloses an integrated part for a vehicle, its application may be limited.

Inhomogeneities such as seams and openings between separate vehicle components may also add to the cost of assembling, sealing and/or insulating an interior of the vehicle and/or its components. Moreover such seams and openings may cause aerodynamic inefficiencies and disturb the vehicle's overall aesthetical appearance. Additional components may also be required to connect separate vehicle components to one another, which may add to the overall weight of a vehicle.

Many vehicles also have opaque regions around edges of their windows in order to conceal rubber seals, wires and/or adhesives. For example, a vehicle may have window may include an outer fritted region or a region having a dot pattern. These opaque regions are typically formed of a thin layer of adhesive film. Over time, however, the adhesive behind this thin layer of film may wear away and the film may detach from the surface of a window, thereby deteriorating the component's overall aesthetic appeal and/or exposing concealed components.

The present disclosure aims to solve these problems and other problems in the prior art.

SUMMARY

In accordance with the purpose(s) of the invention, as embodied and broadly described herein, this disclosure, in one aspect, relates to vehicle components, including tailgates, and to surfaces of a plastic glazing of a tailgate including textures and/or patterns.

As will be apparent from the present disclosure, problems and/or objectives for improvement with respect to a tailgate including plastic glazing, as described herein, may include providing a tailgate that integrates one or more other components of a vehicle, thereby reducing a total number of components of a vehicle and reducing the complexity and cost of assembling a vehicle. Such problems and/or objectives for improvement also may include providing a tailgate that reduces a number of inhomogeneities, seams, and other faults along a surface of a vehicle, thereby increasing an aesthetic appearance of the vehicle and increasing aerodynamic performance. Such problems and/or objectives for improvement further may include providing a tailgate that conceals one or more other features of a vehicle, such as, for example, a light assembly or unit, thereby increasing an aesthetic appearance of the vehicle.

Problems and/or objectives for improvement with respect to a tailgate, as described herein, may also include providing a tailgate having a texture and/or pattern that conceals a rubber seal, wire or adhesive behind a window of a vehicle. The text and/or pattern may be injection molded into the tailgate such that it is durable and resistant to environmental factors. Such problems and/or objectives for improvement also may include methods for manufacturing a tailgate having a texture and/or pattern that reduces labor costs and increases production rate. Such a method may involve using multi-shot injection molding machines that automate and decrease production times.

Accordingly, aspects of the present disclosure provide a plastic glazing of a tailgate of a vehicle, the plastic glazing comprising: a translucent component, wherein a portion of the translucent component forms a rear window of the vehicle; a non-transparent component molded onto the translucent component, wherein an overlapping portion of the translucent component and the non-transparent component forms a blackout region proximate to the rear window, wherein the plastic glazing is of one-piece molded plastic construction, wherein the translucent component comprises a first textured surface in a region adjacent to the blackout region, where the first textured surface is configured to conceal a component of the vehicle.

Other aspects of the present disclosure provide a plastic glazing of a tailgate of a vehicle, the plastic glazing comprising: a translucent component, wherein a portion of the translucent component forms a rear window of the vehicle; a non-transparent component molded onto the translucent component, wherein an overlapping portion of the translucent component and the non-transparent component forms a blackout region proximate to the rear window, wherein the plastic glazing is of one-piece molded plastic construction, wherein the non-transparent component forms a pattern in the blackout region.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The foregoing summary, as well as the following detailed description, is better understood when read in conjunction with the appended drawings. There is shown in the drawings example embodiments, and the present invention is not intended to be limited to the specific embodiments and methods disclosed.

FIG. 4 is a cross-sectional view of the second exemplary tailgate glazing depicted in FIG. 3.

FIG. 5 is an enlarged view of a region of the second exemplary plastic glazing depicted in FIG. 3 according to an embodiment of the present disclosure showing an exemplary textured surface.

FIG. 6 is a cross-sectional view of the region of the second exemplary plastic glazing depicted in FIG. 5.

FIG. 7 is an enlarged view of a region of the second exemplary plastic glazing depicted in FIG. 3 according to an alternative embodiment of the disclosure showing an exemplary patterned surface.

FIG. 8 is a cross-sectional view of the region of the second exemplary plastic glazing depicted in FIG. 7.

FIG. 9 is an enlarged view of a region of the second exemplary plastic glazing depicted in FIG. 3 according to another alternative embodiment of the disclosure showing an exemplary inverted grit pattern.

FIG. 10 is a cross-sectional view of the region of the second exemplary plastic glazing depicted in FIG. 9.

FIG. 11 is a cross-sectional view of the region of the second exemplary plastic glazing depicted in FIG. 9 according to an alternative embodiment of the present disclosure further showing a protective layer.

DESCRIPTION

Figure 1:
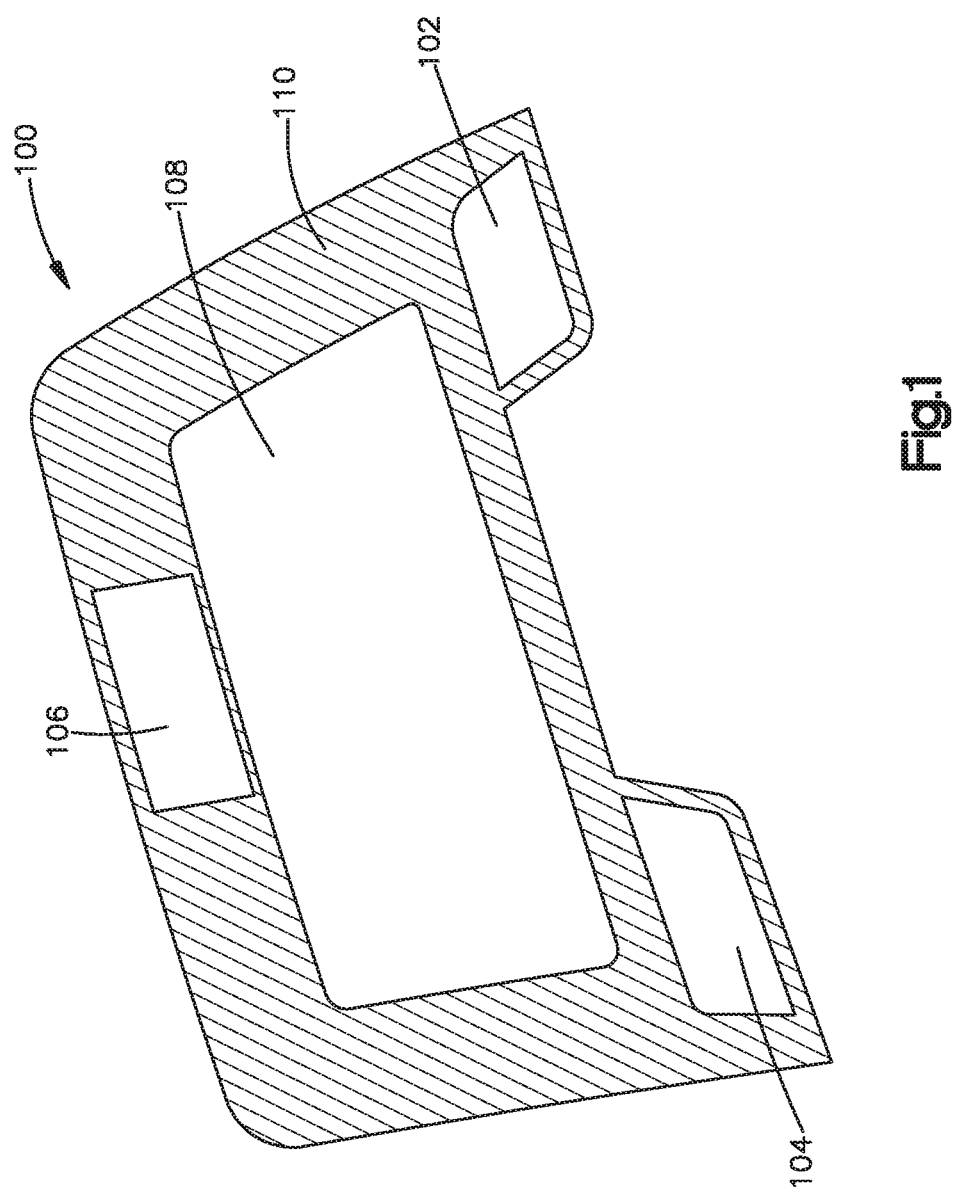
FIG. 1 is a schematic view of a front of a first exemplary plastic glazing of a tailgate in accordance with an embodiment of the present disclosure.

Aspects of the disclosure will now be described in detail with reference to the drawings, wherein like reference numerals designate identical or corresponding parts throughout the several views, unless specified otherwise.

Systems and methods disclosed herein provide a tailgate or lift gate and, in particular, a tailgate having a plastic glazing having a one-piece monolithic construction. The one-piece monolithic structure can be fabricated in one piece using an injection molding process. Vehicles of a hatchback or van configuration typically include an access opening at their rear and a tailgate that selectively opens and closes the access opening. The tailgate may be mounted on the main body of the vehicle using a hinged connection. As such, the tailgate may operate like a hinged flap, which swings open and close along the hinged connection. The tailgate is typically operated manually but may also be operated electronically using a power actuator.

The tailgate may support one or more other vehicle components such as a rear window, a logo or marking, a light assembly or unit, a license plate holder, etc. These components are usually attached to the tailgate using screws or other connectors or an adhesive. In its closed position, the tailgate may also be adjacent to one or more cavities in the body of the vehicle for receiving a rear lamp unit or other light unit.

In order to reduce the number of separate components of a vehicle, systems and methods disclosed herein may provide an integrated tailgate assembly including and/or integrating one or more other vehicle components. For example, systems and methods disclosed herein may provide a tailgate having a plastic glazing including a rear window. The plastic glazing of the tailgate may be constructed of a thermoplastic polymer including a portion that is clear as the rear window. In other systems and methods disclosed herein, additional vehicle components may also be included in the plastic glazing. Such components may include, for example, a colored translucent portion for a rear light unit; an additional translucent portion for a courtesy light, a license plate light, or other light unit; a cavity and fixation unit (e.g., a threaded hole, a hook or clip) for supporting a light unit; a cavity and fixation unit for supporting a license plate; a textured and/or raised region for a logo or other marking; a spoiler or other aerodynamic feature; an opening that serves as a ventilation opening; and the like.

Systems and methods disclosed herein may also provide a tailgate that reduces a number of inhomogeneities, seams, and other disruptions, interruptions, and gaps along a surface of a vehicle, thereby increasing an aesthetic appearance of the vehicle and increasing aerodynamic performance. Systems and methods disclosed herein further may provide a tailgate that conceals one or more other features of a vehicle, such as, for example, a light unit, thereby increasing an aesthetic appearance of the vehicle.

Systems and methods disclosed herein may also provide a method of manufacturing a tailgate or, specifically, a plastic glazing of a tailgate. Such systems and methods may provide a method of producing a plastic glazing using multi-shot injection molding techniques. For example, in certain aspects of the disclosure, a plastic glazing of a tailgate may be formed via a three-shot injection molding process. In a first shot, a clear thermoplastic polymer may be injected to form a shell or outline of the plastic glazing. In a second shot, a colored thermoplastic polymer may be injected to form one or more colored regions in the plastic glazing. For example, a red thermoplastic polymer may be injected to form a red translucent region to serve as the lens for a rear light of a vehicle. In an additional shot, a non-transparent thermoplastic may be injected to form a blackout region (e.g., opaque or substantially opaque region)

of the plastic glazing. The blackout region may form a border around a rear window.

Systems and methods disclosed herein may also provide a plastic glazing of a tailgate having a textured surface or a pattern. The textured surface or pattern may be disposed on a window or adjacent to a window formed in the plastic glazing. The window may be formed by a clear translucent portion of the plastic glazing. The textured surface or pattern may conceal one or more other vehicle components, such as, for example, electric wiring. The textured surface or pattern may also conceal any adhesive of fixation mechanisms used to attach the plastic glazing to a housing unit or other component of the tailgate. In certain aspects, the textured surface or pattern may be provided on an interior surface of a portion of the plastic glazing near the edges of the window. In certain aspects, the textured surface or pattern may be formed by a non-transparent thermoplastic polymer forming a blackout region on or adjacent to the window. In other aspects, the textured surface or pattern may be formed by a translucent thermoplastic polymer that forms the window. In still other aspect, the textured surface or pattern may be formed by a film disposed on a thermoplastic layer of the plastic glazing.

Referring now to FIG. 1, an exemplary plastic glazing 100 of a tailgate of a vehicle is depicted. The plastic glazing 100 may be a one-piece monolithic structure formed of one or more thermoplastic polymers. Examples of suitable thermoplastic polymers include: polycarbonate, polyester carbonate, poly methyl methacrylate, and the like. According to a preferred aspect of the disclosure, the plastic glazing 100 may be formed of a polycarbonate. The plastic glazing 100 can have an outer surface that is seamless, i.e., lacking any visual openings, junctions, disruptions, interruptions, gaps, or the like.

The plastic glazing 100 has a first colored portion 102 that functions as a portion of a right tail lamp of the vehicle, and a second colored portion 104 that functions as a portion of a left tail lamp of the vehicle. In particular, the colored portions 102, 104 can function as lenses of the tail lamps of the vehicle. The plastic glazing 100 also has a third portion 106 for an additional light unit such as, for example, an axillary brake light or a courtesy light. The plastic glazing 100 also includes a clear translucent portion 108 that functions as a rear window of the vehicle, and a colored non-transparent portion 110. The colored non-transparent portion may be strategically placed to hide one or more structures positioned behind the plastic glazing 100.

Figure 2:
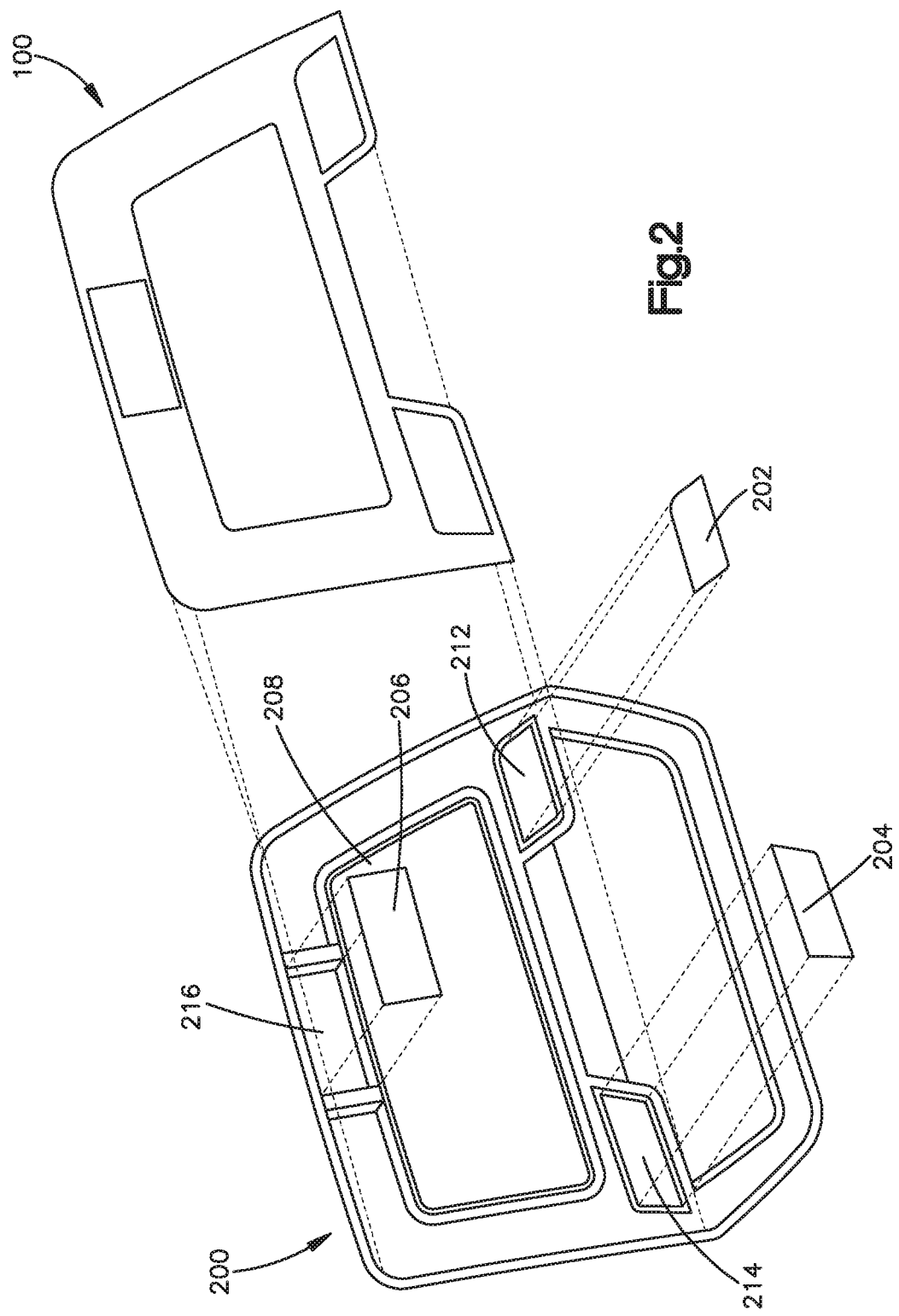
FIG. 2 is a deconstructed view of a tailgate assembly including the first exemplary plastic glazing depicted in FIG. 1 and a housing unit in accordance with an embodiment of the present disclosure.

Referring now to FIG. 2, a housing unit 200 of a tailgate is depicted. The housing unit 200 may be formed of a fiber-reinforced polymer. According to a preferred aspect of the disclosure, the housing unit 200 may be formed of a long-glass fiber-reinforced polypropylene such as, for example, SABIC® STAMAX™ plastic. As depicted in FIG. 2, the housing unit 200 comprises one or more cavities for receiving a light unit. In particular, the housing unit 200 comprises a first cavity 212 for receiving a first light unit 202, a second cavity 214 for receiving a second light unit 204, and a third cavity 216 for receiving a third light unit 206. The light units 202, 204, 206 can be fixed directly onto the housing unit 200 via access doors and/or using mechanical fasteners (e.g., screw, bolt, and the like). The cavities 212, 214, 216 can prevent light from the light units from bleeding outside of a confined space. As such, additional cavities (not depicted) may be formed next to the cavities 212, 214, 216 for holding additional light units, and the cavities would prevent the light generated by one light unit from bleeding into a space reserved for another light unit.

The light units 202, 204, 206 may be a single type of light unit. For example, the light units 202, 204, 206 can be brake light units. Alternatively, the light units 202, 204, 206 may comprise more than one kind of light unit. For example, the light units 202, 204 can be brake light units, and the light unit 206 can be a courtesy light unit.

The plastic glazing 100 may be secured to the housing unit 200 such that the light units 202, 204, 206 are disposed between the plastic glazing 100 and the housing unit 200. In particular, the plastic glazing 100 may be secured to the housing unit 200 such that the light units 202, 204, 206 are disposed behind the portions 102, 104, 106 (depicted in FIG. 1). The light unit 202 may be disposed behind the first colored portion 102, the light unit 204 may be disposed behind the second colored portion 104, and the light unit 206 may be disposed behind the third portion 106.

Light emitted from the light units 202, 204, 206 through the portions 102, 104, 106 of the plastic glazing 100 may be emitted as a colored light in accordance with certain international standards governing vehicle lighting such as, for example, ECE Regulation No. 48 and SAE Standard J578. As noted above, the portions 102, 104 can function as the lens for the vehicle's tail lamps. Accordingly, light emitted from the light units 202, 204 through the portions 102, 104 may be red. ECE Regulation No. 48 defines the color "red" as emitted light with chromaticity coordinates (x,y) that lie within the chromaticity areas defined by the following boundaries in the CIE xyY color space:

| $R_{12}$ | yellow boundary: | y = 0.335 |
|---|---|---|
| $R_{23}$ | the spectral locus | |
| $R_{34}$ | the purple line | |
| $R_{41}$ | purple boundary: | y = 0.980 − x |

With the following (x,y) intersection points:
$R_1$: (0.645,0.335)
$R_2$: (0.665,0.335)
$R_3$: (0.735,0.265)
$R_4$: (0.721,0.259)
Thus, to fulfill this regulation, the light emitted through the portions 102, 104 may have chromaticity coordinates (x,y) that fall within the chromaticity area defined for the color red in ECE Regulation No. 48, as set forth above.

While the portions 102, 104 and the light units 202, 204 are described herein as producing a red light, one of ordinary skill in the art would appreciate that the portions 102, 104 and the light units 202, 204 may also be designed to produce lights having other colors, such as, for example, yellow or amber. These colors are also defined in ECE Regulation No. 48 as well as in other international standards.

The housing unit 200 also includes an opening 208. When the plastic glazing 100 is secured to the housing unit 200 such that the light units 202, 204, 206 line up with the portions 102, 104, 106, the opening 208 may line up with the clear translucent portion 108 of the plastic glazing 100. By lining up with the clear translucent portion 108, the opening 208 allows an individual's view through the translucent portion 108 (which, as described above, may function as the rear window of the vehicle) to remain unobstructed.

Each of the light units 202, 204, 206 may include one or more light components such as, for example, an incandescent lamp, an electroluminescent lamp, a gas discharge lamp, and the like. Because the light units 202, 204, 206 are secured directly onto the housing unit 200, a separate housing for each light unit 202, 204, 206 may not be needed. Thus, the housing unit 200, which serves as the structural carrier for the plastic glazing 100 of the tailgate, integrates a housing function of a light unit. Moreover, because the portions 102, 104, 106 may function as the lens of a light unit—i.e., the portion 102 may function as the lens for the light unit 202, the portion 104 may function as the lens for the light unit 204, and the portion 106 may function as the lens for the light unit 206—a separate lens for each light units 202, 204, 206 also may not be needed.

The plastic glazing 100 may be secured to the housing unit 200 using an adhesive and/or a mechanical fastening system (e.g., a screw bolt or clip fastening system). The adhesive used may be a commercially available adhesive that is typically used in the automotive industry for the adhesive bonding of plastic components. Such adhesives may include, for example, wet adhesives, contact adhesives, hot-melt adhesives, or reaction adhesives. The thickness of the adhesive required may vary depending on the specific geometries of the plastic glazing 100 and the housing unit 200. When the adhesive is a hot-melt adhesive that can be processed under thermoplastic conditions, it may be possible to bond the plastic glazing 100, the housing unit 200, and the hot-melt adhesive together during a multi-shot injection molding process.

While the tailgate including the plastic glazing 100 and the housing unit 200 is depicted as having three light units 202, 204, 206, one of ordinary skill in the art would appreciate that the tailgate can comprise less or more light units. Such light units may include, for example, license plate lamps, turn signal lamps, backup lamps, and the like.

Figure 3:
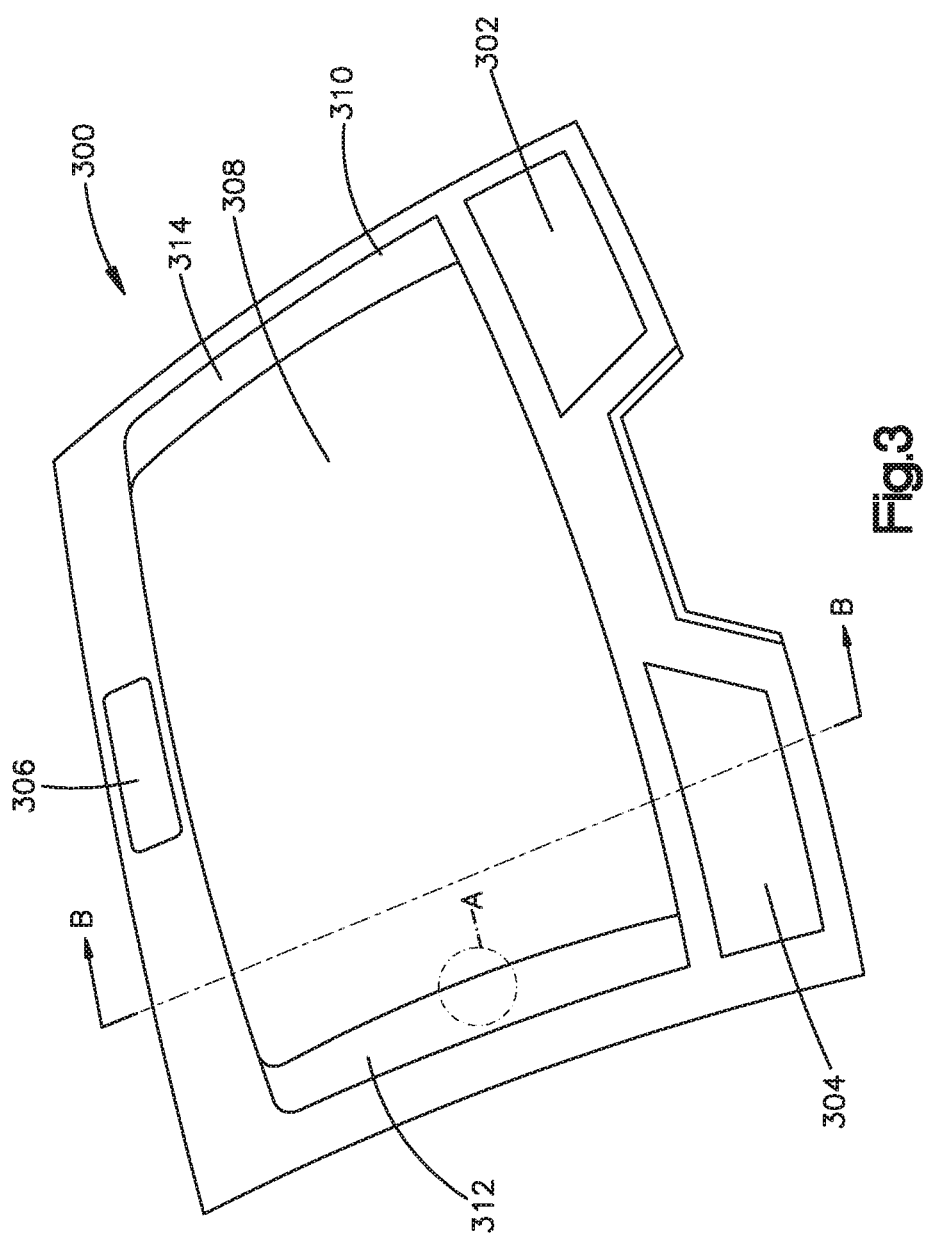
FIG. 3 is a schematic view of a front of a second exemplary plastic glazing of a tailgate in accordance with an embodiment of the present disclosure.

Referring now to FIG. 3, an exemplary plastic glazing 300 of a tailgate of a vehicle is depicted. The plastic glazing 300 may be similar to the plastic glazing 100 depicted in FIG. 1 but may include additional sections 312, 314. The plastic glazing 300 may be of one-piece monolithic molded plastic construction, and may have an outer surface that is substantially free of any inhomogeneities, seams, and other disruptions, interruptions, and gaps.

The plastic glazing 300 may have two colored translucent portions 302, 304 that function as lens of tail lamp units of the vehicle. The plastic glazing 300 may also have an additional clear or colored portion 306 that functions as a lens of an additional light unit. The plastic glazing 300 may further have a clear translucent portion 308 that functions as a rear window of the vehicle, and a non-transparent portion 310. The non-transparent portion 310 may surround the clear translucent portion 308, thereby outlining the rear window of the vehicle. The plastic glazing 300 may also have sections 312, 314, which may include a textured surface and/or a pattern.

While the plastic glazing 300 is depicted with two sections 312, 314 that may include a textured surface or a pattern, one of ordinary skill in the art would appreciate that a plastic glazing such as the plastic glazing 300 of FIG. 3 can include sections other than the sections 312, 314 that may include a textured surface or a pattern. Such sections, for example, may be disposed along a top of bottom edge of a translucent portion corresponding to the rear window. Thus, sections 312, 314 and any such additional sections may form a continuous region surrounding a translucent portion corresponding to the rear window of the plastic glazing. Moreover, one of ordinary skill in the art would appreciate that the section 312, 314 may be wider or narrower, or comprise a different shape, than how they are depicted in FIG. 3.

FIG. 4 depicts a cross-sectional view of the plastic glazing 300 along the line B-B. As depicted in FIG. 4, the plastic glazing 300 may comprise multiple thermoplastic polymers. The plastic glazing 300 may comprise a clear translucent component 320, a dark component 322, and a colored component 324. The dark component 322 may be black (e.g., blackout) or be another color and/or effect. Each component may be formed by a different thermoplastic polymer such as, for example, different colored polycarbonate resins. The translucent component 320 may be formed of a clear thermoplastic polymer to provide a clear unobstructed view there through. In certain aspects, the translucent component 310 may comprise a certain degree of color but nonetheless retain sufficient transparency to allow a high degree of light transmittance. For example, the translucent component 310 can comprise a tint, such as a grey, green, or brown tint. The dark component 322 may be a black or other colored non-transparent thermoplastic polymer that is configured to control light transmission through the translucent component 320. In particular, the dark component 322 may be optimally positioned on the plastic glazing 300 to conceal one or more vehicle components disposed behind the plastic glazing 300 such as, for example, a housing unit. The dark component 322 may also conceal any adhesive or fixation mechanisms used to attach the plastic glazing to a housing unit or other component of the tailgate.

The translucent component 320 may be in a first layer, and the dark component 322 and the colored component 324 may be in a second layer separate from the first. The translucent component 320, the dark component 322, and the colored component 324 may have the same thickness or different thicknesses. In an aspect of the disclosure, the translucent component 320 may have a thickness that is greater than that of the dark component 322 and the colored component 324. The translucent component 320 can have a greater thickness in order to provide structural strength to the plastic glazing 300. In another aspect of the disclosure, the thickness of the dark component 322 may be increased in order to provide additional structural support to an outer panel of the plastic glazing 300 along which the dark component 322 is disposed.

The translucent component 320 may define a panel or overall shell of the plastic glazing 300. The dark component 322 and the colored component 324 may be disposed behind the translucent component 320 towards an interior of a vehicle. By being disposed behind the translucent component 320, the dark component 322 and the colored component 324 can be protected from weathering effects. Moreover, the dark component 322 and the colored component 324 would not create any inhomogeneities or raised portions on a surface of the vehicle.

A first portion of the clear translucent component 320 that does not overlap the dark component 322 and the colored component 324 in the longitudinal direction (i.e., a direction along the line B-B) may form the translucent portion 308 that functions as the rear window of the vehicle. The colored component 324 and a second portion of the clear translucent component 320 that overlaps the colored component 324 in the longitudinal direction may form the colored portion 304 that functions as a lens of a tail lamp unit. And the dark component 322 and additional portions of the clear translucent component 320 that overlap the dark component 322 in the longitudinal direction may form the non-transparent portion 310.

The plastic glazing 300 may be manufactured or produced using an injection molding technique. In particular, the plastic glazing 300 may be produced using a three-shot injection molding technique. The three-shot injection molding technique may use a mold cavity that can be altered between different volumes. The mold cavity may be an example of a molding apparatus. The mold cavity may be set to a first volume for receiving a first shot of material. The first shot of material may form the translucent component 320. Accordingly, the mold cavity may be set to a volume corresponding to that of the translucent component 320. A first material may be injected into the mold cavity to form the translucent component 320. The first material may be a clear, translucent thermoplastic polymer such as, for example, a clear polycarbonate. After the first shot has been injected, the mold cavity may be changed from its first volume into a second volume.

The next shot of material may form the colored component 324. Accordingly, the mold cavity can be set to a volume corresponding to that of the colored component 324. A second material may be injected into the mold cavity to form the colored component 324. The second material may be a similar type of material as the first material so that heat released by the second material along the edge of the first material may melt and fuse (i.e., combine) the colored component 324 to the clear translucent component 320. As such, if the first material is a clear polycarbonate, the second material may be a colored polycarbonate, such as, for example, a red polycarbonate. After the second shot has been injected, the mold cavity can be changed from its second volume to a third volume. The third and final shot of material may form the dark component 322. Accordingly, the mold cavity can be set to a volume corresponding to that of the dark component 322. Such may involve taking into account the portion of the cavity already filled by the first and second shots. A third material may be injected into the mold cavity to form the dark component 322. The third material also may be a similar type of material as the first and second materials such that heat released by the third material along the end of the first and second materials may melt and fuse the other components to the dark component 322. After the third shot, the entire molded assembly may be left to cool.

According to certain aspects of the disclosure, the order of the second shot and the third shot can be changed. Thus, instead of injecting the second material to form the colored component 324 in the second shot, the third material for forming the dark component 322 can be injected during the second shot. In such aspects, the mold cavity can be adjusted first to a volume corresponding to the dark component 322 and then to a volume corresponding to the colored component 324.

FIGS. 5-11 present alternative embodiments of a region labeled A (depicted in FIG. 3) of the second exemplary plastic glazing 300. FIGS. 5 and 6 show a first embodiment where the section 312 has a textured surface. FIGS. 7 and 8 show a second embodiment where the section 312 has a pattern. And FIGS. 9-11 show a third embodiment where the section 312 has an inverted frit pattern. Each of these embodiments will be discussed in turn below.

As depicted in FIG. 5, the section 312 of the plastic glazing 300 has a textured surface. The textured surface is disposed next to the translucent portion 308. FIG. 6 shows a cross-sectional view of the section 312 along line C-C depicted in FIG. 5. As shown in FIG. 6, the section 312 may be formed of a translucent component 400. The translucent component 400 can correspond to the translucent component 320 depicted in FIG. 4. In other words, the translucent component 400 may be a separate region of the same translucent component 320. The translucent component 400 may have a textured surface having a plurality of raised structures 402. In an aspect of the disclosure, the raised structures may be microstructures.

The plurality of raised structures 402 may be disposed on a side of the translucent component 400 towards an interior of the vehicle. As such, the plurality of raised structures 402 would not be subject to environmental factors on the outside of the vehicle. The plurality of raised structures 402 may reduce a degree of transparency of the translucent component 400 due to their influence on the passage of light through the translucent component 400. In particular, the plurality of raised structures 402 can scatter and/or diffuse light, thereby reducing the visibility of items disposed on either side of the translucent component 400 from the other side. By reducing the transparency of the translucent component 400, the plurality of raised structures 402 can help to conceal a vehicle component located behind the section 312. Such may include, for example, a housing unit of the tailgate, adhesives or other fixation mechanisms used to attach the plastic glazing to the housing unit, wires around an edge of a rear window of a vehicle, and the like.

Because the plurality of raised structures 402 of the textured surface reduces the transparency of the translucent component 400, it may not be necessary to have a dark component, such as, for example, the dark component 322 described above with respect to FIG. 4, to black out the section 312 of the plastic glazing 300. As described above, a dark component (e.g., the dark component 322) that is placed behind a translucent component (e.g., the translucent component 320) may also serve to conceal one or more vehicle component and/or fixation mechanisms behind a region of the plastic tailgate. The addition of the dark component, however, may add to the weight of a vehicle. Moreover, the dark component may completely eliminate the passage of light through the translucent component 400 into the interior of the vehicle, thereby creating a darker environment within the vehicle. Such can be avoided through the use of a textured surface, such as the textured surface depicted in FIGS. 5 and 6 having the plurality of raised structures 402. The textured surface would be formed on an existing component (i.e., the translucent component 400), and therefore would not add to the overall weight of the vehicle. The textured surface can also be adjusted to allow an optimal degree of light through into the interior of the vehicle.

The plurality of raised structures 402 may be formed when the translucent component 400 is molded using an injection molding technique. As described above, the translucent component 320 may be formed using an injection molding technique, whereby a first cavity is configured to receive a shot of clear translucent material. Similar to the translucent component 320, the translucent component 400 may be formed using a mold cavity that is configured to receive a shot of clear translucent material. The clear translucent material may be, for example, a clear polycarbonate resin. The mold cavity may comprise a surface having a plurality of indentations that is configured to form the plurality of raised structures 402. Thus, when the clear translucent material is injected into the mold cavity, the resulting translucent component (i.e., the translucent component 400) would have a surface having the plurality of raised structures 402.

While the textured surface depicted in FIGS. 5 and 6 is shown to have a plurality of lines or ridges, one of ordinary skill in the art would appreciate that other types of textures, including textures formed of dots and other types of structures can also be used.

Referring now to FIG. 7, an alternative embodiment of the section 312 is depicted. The section 312 depicted in FIG. 7 has a pattern. FIG. 8 depicts a cross-sectional view of the section 312 including the pattern. As depicted in FIG. 8, the section 312 may comprise a translucent component 502 and a patterned film 506.

The translucent component 502 may correspond to the translucent component 320 depicted in FIG. 4 (i.e., be a separate region of the same translucent component 320). The patterned film 506 comprises the pattern, which is visible through the translucent component 502 (as shown in FIG. 7). The patterned film 506 can be disposed behind the translucent component 502 towards an interior of the vehicle.

Similar to the textured surface described with respect to FIGS. 5 and 6, the pattern of the patterned film 506 may also conceal a vehicle component located behind the section 312. Such may include, for example, a housing unit of the tailgate, adhesives or other fixation mechanisms used to attach the plastic glazing to the housing unit, wires around an edge of a rear window of a vehicle, and the like. The patterned film may include translucent and non-transparent portions. The patterned film may allow for the inclusion of complex patterns that may not be easily injection molded using a single-colored component such as, for example, a dark component (e.g., the dark component 322). The patterned film may also remove the need for a dark component (e.g., the dark component 322), which may reduce an overall weight of the vehicle.

The section 312 may be formed as part of an injection molding process for forming the plastic glazing 300, similar to the one described above with respect to FIG. 4. The specific type of injection molding process may be referred to as film insert molding, also known as in-mold decoration. Each of the translucent component 502 and the patterned film 506 may be a polycarbonate resin or other thermoplastic polymer. In a preferred aspect, both components are formed using the same thermoplastic polymer to enable optimal bonding between the separate components.

The pattern on the patterned film 506 may be ink printed onto a first surface. The ink printed onto the first surface of the patterned film 506 may comprise a polymer resin such as, for example, a polycarbonate resin. The ink may be applied onto the first surface of the patterned film 506 via screen printing, although other method of printing known to those skill in the art are also acceptable, such as but not limited to mask/spray in-jet, and pad or tampon printing. Once the ink is printed, drying should be thorough to ensure that any retained solvent is removed from the print. Residual or retained solvent may cause problems at a later stage with cracking/crazing of the polycarbonate itself due to solvent damage. The inks may be thermally cured by being exposed to an elevated temperature for a period of time. For example, a printed ink can be substantially cured upon exposure to about 90-125° C. for about 20-60 minutes. The thickness of the cured ink print is typically about 4 micrometers to 20 micrometers, with between about 8 micrometers to 18 micrometers being preferred.

After the ink pattern has been applied to the patterned film 506, the patterned film 506 may be trimmed to a desired shape. For example, the patterned film 506 may be trimmed such that it conforms to an area corresponding to the section 312. In a preferred aspect of the disclosure, the thickness of the patterned film 506 is approximately 0.05 to 2 millimeters. The small thickness allows the patterned film 506 to be shaped prior to being bonded to one or more other components (e.g., the translucent component 502).

The patterned film 506 can be placed into a first mold cavity for receiving a material for forming the translucent component 502. Since the section 312 does not cover an entire surface of the translucent component 320 (of which a region is the translucent component 502), the patterned film 506 may only cover a portion of the first mold cavity. The patterned film 506 may be placed into the mold cavity such that the printed ink pattern is disposed towards a wall of the cavity. Through such placement, the ink pattern may be shielded from the heat of the shot of material forming the translucent component 502. The patterned film 506 may be held to the wall of the cavity by vacuum or any other means known to those skilled in the art of film insert molding.

When the shot of material for forming the translucent component 502 is injected into the mold cavity, it would bond with a second surface of the patterned film 506 that does not have the ink pattern. In a preferred aspect where the translucent component 502 and the patterned film 506 are both the same type of thermoplastic polymer, the heat from the shot of material forming the translucent component 502 may melt the film layer, thereby causing the two layers to bond together when they cool. The first mold cavity can be adjusted to a second mold cavity (i.e., the volume of the mold cavity may be changed from a first volume to a second volume).

Referring now to FIG. 9, another alternative embodiment of the section 312 is depicted. The section 312 depicted in FIG. 9 has a halftone pattern, such as, for example, an inverted frit or dot pattern. FIG. 10 depicts a cross-sectional view of the section 312 including the halftone pattern. As depicted in FIG. 10, the section 312 comprises a translucent component 602 and a dark component 604. The translucent component 602 may correspond to the translucent component 320 depicted in FIG. 4 (i.e., be a separate region of the same translucent component 320). The dark component 604 may correspond to the dark component 322 depicted in FIG. 4 (i.e., be a separate region of the same dark component 322).

The dark component 604 may be formed in the shape of the halftone pattern. The dark component 604 can be disposed behind the translucent component 602 toward an interior of the vehicle. The dark component 604 can be bonded to the translucent component 602 in an injection molding process. Such a bonding process may comprise a polymerization where a molecules of the first material and molecules of the second material react together to form polymer chains.

As described above, a multi-shot injection technique may be used to form the plastic glazing 300. In a first shot, a clear translucent material may be injected into a mold cavity having a first volume to form the translucent component. After the clear translucent component is formed, the mold cavity may be adjusted to a second volume and so on and so forth for receiving additional shots of material. In a second shot (or a third shot), a black or other colored opaque material may be injected to the mold cavity such that it binds with the clear translucent material. The two materials may bind together through melt bonding. That is, heat from the injected opaque material may melt a surface of the already set clear translucent material such that a bond is formed between the two materials when they cool down. With respect to the translucent component 602 and the dark component 604 depicted in FIG. 10, the same procedure can be used. The shape of the dark component 604 (or the section 312) may be formed by using a mold cavity that has a volume that is accordingly shaped.

The inverted frit pattern of FIG. 9 may be formed using a single continuous section of the dark component 604. In contrast, a traditional frit pattern, which includes a number of separate dot formations, would require a plurality of separate injection points. The inverted frit pattern of FIG. 9, while achieving a similar purpose as the traditional frit pattern, removes the need for having multiple injection points.

While the halftone pattern depicted in FIG. 9 is an inverted dot pattern, one of ordinary skill in the art would recognize that other halftone patterns, both inverted and non-inverted, can be used. Such a pattern may also be designed such that it allows the formation of a single connected region of blackout (e.g., the dark component 604).

According to certain aspects of the disclosure, the tailgate assemblies disclosed herein may also include additional layers on top of the thermoplastic polymer layers. For example, a protective layer such as a weathering layer may be added to a surface of the plastic glazing. An example of such a layer is depicted as item 606 in FIG. 11, where such a layer is applied to an interior surface of the plastic glazing. In alternative aspects, such a layer may be applied to both the interior and exterior surface of the plastic glazing, or to only the exterior surface of the plastic glazing. The layer preferably comprises either a polyurethane coating or a combination of an acrylic primer and a silicone hard-coat. Alternatively, other coating systems may be used. An example of such an acrylic primer includes Exatec® SHP 9X, which is commercially available from Exatec, LLC (Wixom, Mich.) and distributed by General Electric Silicones (Waterford, N.Y.). In one preferred embodiment, the primer is coated on the plastic glazing of the tailgate, air dried, and then thermally cured between about 80° C. and 130° C. for between about 20 to 80 minutes and more preferably at about 120° C. for about 60 minutes. A silicone hard-coat is then applied over the primer layer and is air dried before curing at preferably between about 80° C. and 130° C. for between about 20 to 80 minutes and more preferably at about 100° C. for about 30 minutes. A preferred silicone hard-coat used in the present invention is available from Exatec, LLC and distributed by General Electric Silicones as Exatec® SHX.

As another example, an abrasion resistance layer can also be applied to a surface of the plastic tailgate or even to another protective layer, such as the weathering layer described above. Specific examples of possible inorganic coatings comprising the abrasion resistant layer include, but are not limited to, aluminum oxide, barium fluoride, boron nitride, hafnium oxide, lanthanum fluoride, magnesium fluoride, magnesium oxide, scandium oxide, silicon monoxide, silicon dioxide, silicon nitride, silicon oxy-nitride, silicon oxy-carbide, silicon carbide, hydrogenated silicon oxy-carbide, tantalum oxide, titanium oxide, tin oxide, indium tin oxide, yttrium oxide, zinc oxide, zinc selenide, zinc sulfide, zirconium oxide, zirconium titanate, or glass, and mixtures or blends thereof. The abrasion resistant layer may be applied by any technique known to those skilled in the art. These techniques include deposition from reactive species, such as those employed in vacuum-assisted deposition processes, and atmospheric coating processes, such as those used to apply sol-gel coatings to substrates.

As another example, an additional layer for adding more support to the thermoplastic polymer layers may also be added to an interior surface of the plastic glazing. This additional layer may be formed of a plastic, a metal, or other material for increasing the structural strength of the tailgate.

It will be appreciated that the present disclosure may include any one and up to all of the following examples.

Example 1

A plastic glazing of a tailgate of a vehicle, the plastic glazing comprising: a first translucent component, wherein a portion of the first translucent component forms a rear window of the vehicle; a non-transparent component molded onto the first translucent component, wherein an overlapping portion of the first translucent component and the non-transparent component forms a blackout region proximate to the rear window, wherein the plastic glazing is of one-piece molded plastic construction, wherein the first translucent component comprises a first textured surface in a region adjacent to the blackout region.

Example 2

The plastic glazing of Example 1, wherein the non-transparent component comprises a second textured surface.

Example 3

The plastic glazing of any one of Examples 1-2, further comprising a protective layer formed on top of the first textured surface configured to protect the first textured surface.

Example 4

A plastic glazing of a tailgate of a vehicle, the plastic glazing comprising: a first translucent component, wherein a portion of the first translucent component forms a rear window of the vehicle; a non-transparent component molded onto the first translucent component, wherein an overlapping portion of the first translucent component and the non-transparent component forms a blackout region proximate to the rear window, wherein the plastic glazing is of one-piece molded plastic construction, wherein the non-transparent component forms a pattern in the blackout region.

Example 5

The plastic glazing of any of Examples 1 and 4, wherein each of the first translucent component and the non-transparent component comprise a thermoplastic polymer.

Example 6

The plastic glazing of Example 5, wherein the thermoplastic polymer is a polycarbonate.

Example 7

The plastic glazing of any of Examples 1 and 4, further comprising a second translucent component molded onto the first translucent component, wherein the second translucent component is a colored thermoplastic polymer, wherein an overlapping portion of the first translucent component and the second translucent component forms a lens of a light unit.

Example 8

The plastic glazing of any of Examples 1 and 4, wherein the plastic tailgate is produced using a multi-shot injection molding process.

Example 9

The plastic glazing of Example 8, wherein the second translucent component is molded onto the first translucent component in a second shot of the multi-shot injection molding process.

Example 10

The plastic glazing of Example 8, wherein the non-transparent component is molded onto the first translucent component in a second shot of the multi-shot injection molding process.

Example 11

The plastic glazing of Example 1, wherein the blackout region comprises a pattern, and wherein the pattern is visible from an exterior of the vehicle.

Example 12

The plastic glazing of any one of Examples 4 and 11, wherein the pattern comprises a gradient.

Example 13

The plastic glazing of any one of Examples 4 and 11, wherein the pattern comprises an inverted frit pattern.

Example 14

The plastic glazing of any one of Examples 4 and 11, wherein the non-transparent component forms the pattern.

Example 15

The plastic glazing of any one of Examples 4 and 11, wherein a film forms the pattern.

Example 16

The plastic glazing of Example 15, wherein the film comprises a plurality of microstructures.

Example 17

The plastic glazing of any of Examples 15-16, wherein the film comprises a thermoplastic polymer.

Example 18

The plastic glazing of Example 17, wherein the thermoplastic polymer is a polycarbonate.

Example 19

The plastic glazing of any of Examples 15-18, wherein the film is bonded to at least one of the first translucent component and the non-transparent component.

Example 20

The plastic glazing of Example 19, wherein the bonding occurs during an injection molding process.

Example 21

The plastic glazing of any of Examples 1 and 4, wherein the blackout region is configured to conceal an adhesive.

Example 22

The plastic glazing of any of Examples 1 and 4, wherein the plastic glazing is configured to attach to a housing unit of the tailgate.

Example 23

The plastic glazing of Example 22, wherein the housing unit comprises a cavity for the light unit.

Example 24

The plastic glazing of Example 22, wherein the plastic glazing is attached to the housing unit using an adhesive.

Example 25

The plastic glazing of Example 24, wherein the blackout region is configured to conceal the adhesive attaching the plastic glazing to the housing unit.

In general, systems and methods disclosed herein may alternately comprise, consist of, or consist essentially of, any appropriate components herein disclosed. The invention may additionally, or alternatively, be designed so as to be devoid, or substantially free, of any components used in the prior art compositions or that are otherwise not necessary to the achievement of the function and/or objectives of the present invention.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Aspects of the present disclosure described in connection with illustrated embodiments have been presented by way of illustration, and the present disclosure is therefore not intended to be limited to the disclosed embodiments. Furthermore, the structure and features of each embodiment described herein can be applied to the other embodiments described herein. Accordingly, those skilled in the art will realize that the present disclosure is intended to encompass all modifications and alternative arrangements included within the spirit and scope of the present disclosure, as set forth by the appended claims.

What is claimed is:

1. A plastic glazing of a tailgate of a vehicle, the plastic glazing comprising:
    a translucent component, wherein a portion of the translucent component forms a rear window of the vehicle; and
    a non-transparent component molded onto the translucent component, wherein an overlapping portion of the translucent component and the non-transparent component forms a blackout region proximate to the rear window,
    wherein the plastic glazing is of one-piece molded plastic construction,
    wherein the translucent component comprises a first textured surface in a region adjacent to the blackout region, the first textured surface configured to conceal a component of the vehicle, and
    wherein the first textured surface is formed on the translucent component via an injection molding process.

2. The plastic glazing of claim 1, wherein each of the translucent component and the non-transparent component comprise a polycarbonate.

3. The plastic glazing of claim 1, wherein the blackout region comprises a pattern, and wherein the pattern is visible from an exterior of the vehicle.

4. The plastic glazing of claim 3, wherein the pattern comprises an inverted frit pattern.

5. The plastic glazing of claim 1, wherein the non-transparent component forms the pattern.

6. The plastic glazing of claim 3, wherein a film forms the pattern.

7. The plastic glazing of claim 6, wherein the film is bonded to at least one of the translucent component and the non-transparent component during an injection molding process.

8. The plastic glazing of claim 1, wherein the blackout region is configured to conceal an adhesive.

9. The plastic glazing of claim 1, wherein the plastic glazing is configured to attach to a housing unit of the tailgate, and wherein the blackout region is configured to conceal an adhesive attaching the housing unit to the plastic glazing.

10. The plastic glazing of claim 1, further comprising a protective layer on a surface of the plastic glazing.

11. The plastic glazing of claim 10, wherein the protective layer is provided on an interior or an exterior surface of the plastic glazing.

12. The plastic glazing of claim 10, wherein the protective layer is a weathering layer and comprises a polyurethane coating or a combination of an acrylic primer and a silicone hard-coat.

13. The plastic glazing of claim 1, wherein the non-translucent component is disposed behind the translucent component towards an interior of the vehicle.

14. The plastic glazing of claim 1, wherein the first textured surface includes a plurality of protrusions extending from the translucent component.

* * * * *